(12) United States Patent
Chiang et al.

(10) Patent No.: US 10,437,634 B1
(45) Date of Patent: Oct. 8, 2019

(54) INDEPENDENTLY THREADING API CALLS TO SERVICE A REQUEST

(71) Applicant: Microsoft Technology Licensing, LLC, Redmond, WA (US)

(72) Inventors: Dean Shiyu Chiang, Bellevue, WA (US); Rong Guo, Kenmore, WA (US); Deepak Kumar Singh, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 24 days.

(21) Appl. No.: 15/953,834

(22) Filed: Apr. 16, 2018

(51) Int. Cl.
*G06F 9/48* (2006.01)
*G06F 9/50* (2006.01)
*G06F 9/54* (2006.01)

(52) U.S. Cl.
CPC .......... *G06F 9/4843* (2013.01); *G06F 9/5027* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 9,300,759 B1 | 3/2016 | Jorgensen | |
| 9,531,805 B1 | 12/2016 | Brown et al. | |
| 9,542,391 B1 | 1/2017 | Eisner et al. | |
| 2005/0080930 A1 | 4/2005 | Joseph | |
| 2010/0251242 A1* | 9/2010 | Sivasubramanian | ... G06F 12/02 718/100 |
| 2014/0278808 A1* | 9/2014 | Iyoob | ................. G06Q 30/0206 705/7.35 |
| 2015/0106116 A1* | 4/2015 | de Vries | ................. G16H 10/20 705/3 |
| 2017/0286178 A1 | 10/2017 | Chougule et al. | |
| 2017/0339158 A1* | 11/2017 | Lewis | ................... H04L 63/205 |

FOREIGN PATENT DOCUMENTS

| | | |
|---|---|---|
| CN | 103345420 A | 10/2013 |
| WO | 2016100649 A1 | 6/2016 |

OTHER PUBLICATIONS

"The Salesforce Bulk API—Maximizing Parallelism and Throughput Performance When Integrating or Loading Large Data Volumes", Retrieved from: <<https://web.archive.org/web/20150813003129/https:/developer.salesforce.com/page/The_Salesforce_Bulk_API_-_Maximizing_Parallelism_and_Throughput_Performance_When_Integrating_or_Loading_Large_Data_Volumes>>, Mar. 2014, 14 Pages.

"Amazon Simple Email Service", Retrieved from: <<https://web.archive.org/web/20130112004623/https:/docs.aws.amazon.com/ses/latest/DeveloperGuide/throughput-problems.html>>, Jan. 12, 2013, 2 Pages.

(Continued)

*Primary Examiner* — Tuan C Dao

(74) *Attorney, Agent, or Firm* — Christopher J. Volkmann; Kelly, Holt & Christenson, PLLC

(57) ABSTRACT

An asynchronous engine identifies API calls that are to be made in order to fulfill a received service request. The asynchronous engine secures a separate computing thread for making each API call, and generates the API calls on the separate computing threads. Workflows performed in responding to the service call interact with the asynchronous engine to obtain results from the API calls.

20 Claims, 9 Drawing Sheets

(56) References Cited

OTHER PUBLICATIONS

"Amazon Simple Queue Service", Retrieved from: <<https://docs.aws.amazon.com/AWSSimpleQueueService/latest/SQSDeveloperGuide/sqs-batch-api-actions.html>>, Retrieved on: Mar. 9, 2018, 16 Pages.

"Stack Overflow: Make 20 REST API Calls in Parallel and Combined the Data after all Request is Completed and Display on Screen using Angularjs", Retrieved from: <<https://stackoverflow.com/questions/29521239/make-20-rest-api-calls-in-parallel-and-combined-the-data-after-all-request-is-co>>, Retrieved on: Mar. 9, 2018, 3 Pages.

Dash, Debendra, "C# Corner: Tips and Tricks to Improve WEB API Performance", Retrieved from: <<https://www.c-sharpcorner.com/article/important-steps-to-increasing-web-api-performance/>>, Sep. 23, 2016, 10 Pages.

Dewald, Josh, "MaxCDN: How we Improve our API Response Time by 95%", Retrieved from: <<https://www.maxcdn.com/blog/improved-api-response-time-95/>>, May 23, 2014, 8 Pages.

Smith, Tom, "DZone: How to Deal With Slow APIs", Retrieved from: <<https://dzone.com/articles/how-to-deal-with-slow-apis>>, Aug. 18, 2017, 4 Pages.

"International Search Report and Written Opinion Issued in PCT Application No. PCT/US2019/025087", dated May 24, 2019, 12 Pages.

\* cited by examiner

INDEPENDENTLY THREADING API CALLS TO SERVICE A REQUEST

BACKGROUND

Computing systems are currently in wide use. Some computing systems host services that respond to service requests from other computing systems (such as client computing systems).

In some examples, in order to service a request, the service computing system performs workflows by executing operations performed on the service computing system, itself (referred to as executing on-process code). These can often be performed relatively quickly. In some cases, however, in order to service a request, the service computing system needs to make application programming interface (API) calls to other, external systems (or API endpoints). The API calls to external endpoints can, sometimes, be orders of magnitude slower than executing logic in the on-process code. Therefore, the latency involved with making the API calls can make up a vast majority of the latency in fulfilling the service request. Where the API calls are made sequentially (based upon the order in which the on-service workflows are executed, or for other reasons), then the latency associated with each API call is additive in responding to the service request.

The discussion above is merely provided for general background information and is not intended to be used as an aid in determining the scope of the claimed subject matter.

SUMMARY

An asynchronous engine identifies API calls that are to be made in order to fulfill a received service request. The asynchronous engine secures a separate computing thread for making each API call, and generates the API calls on the separate computing threads. Workflows performed in responding to the service call interact with the asynchronous engine to obtain results from the API calls.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
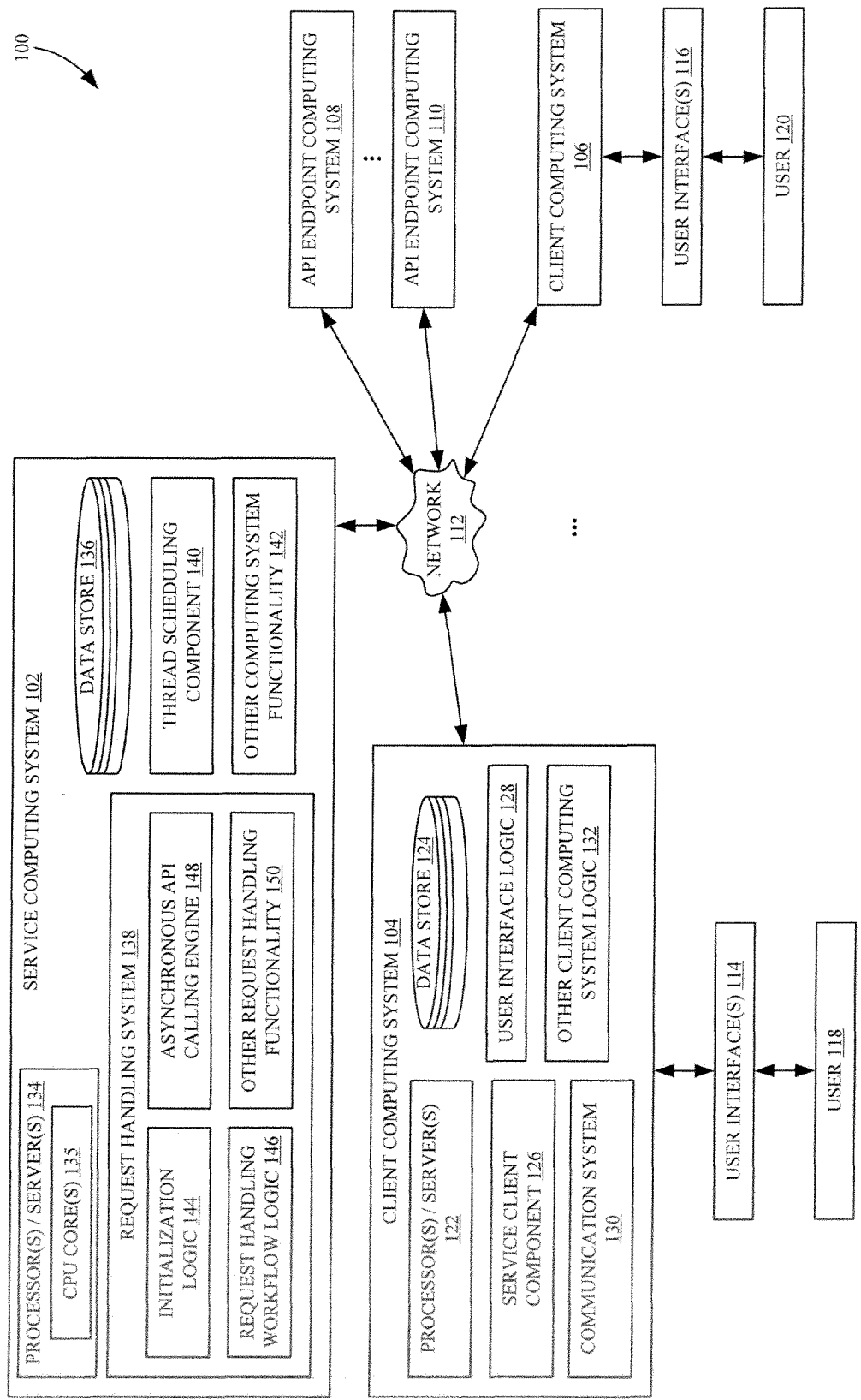
FIG. 1 is a block diagram of one example of a service computing system architecture.

FIG. 1 is a block diagram showing one example of a computing system architecture 100. Architecture 100 shows service computing system 102 connected to a plurality of different client computing systems 104-106, and to a plurality of different application programming interface (API) endpoint computing systems 108-110. Service computing system 102, client computing systems 104-106 and API endpoint computing systems 108-110 are illustratively connected over network 112. Therefore, network 112 can be a wide area network, a local area network, a near field communication network, a cellular communication network, or any of a wide variety of networks or combinations of networks. Client computing systems 104-106 illustratively generate requests to service computing system 102, which services those requests. In servicing those requests, system 102 may execute workflows on service computing system 102, itself, and/or generate API calls to one or more API endpoint computing systems 108-110.

FIG. 1 also shows that each client computing system 104-106 illustratively generates one or more user interfaces 114-116, respectively, for interaction by users 118-120. User 118, for instance, interacts with user interfaces 114 in order to control and manipulate client computing system 104, and some portions of service computing system 102. Similarly, user 120 illustratively interacts with user interfaces 116 in order to control and manipulate client computing system 106, and some portions of service computing system 102.

Client computing systems 104 and 106 can be similar or different. For purposes of the present description, it will be assumed that they are similar so that only client computing system 104 is described in more detail. This is by way of example only.

In the example shown in FIG. 1, client computing system 104 illustratively includes one or more processors or servers 122, data store 124, service client component 126, user interface logic 128, communication system 130, and it can include a wide variety of other client computing system logic or functionality 132. Service client component 126 can be a client component of service computing system 102, which enables client computing system 104 to interact with service computing system 102. It will be noted that component 126 is not always needed, and client computing system 104 can interact directly with system 102, without a client component 126, as well.

Communication system 130 illustratively allows client computing system 104 to interact with other items over network 112. Therefore, communication system 130 is illustratively configured to allow client computing system 104 to communicate over whatever type of network or networks are used as network 112.

User interface logic 128 illustratively generates user interfaces 114 and detects user interaction with user interfaces 114. It can provide an indication of those user interactions to other items on client computing system 104, or over network 112 to other items in FIG. 1.

In the example shown in FIG. 1, service computing system 102 illustratively includes one or more processors or servers 134 (which can include one or more central processing unit (CPU) cores 135), data store 136, request handling system 138, thread scheduling component 140, and it can include a wide variety of other computing system functionality 142. Request handling system 138 can include initialization logic 144, request handling workflow logic 146, asynchronous API calling engine 148, and it can include a wide variety of other request handling functionality 150.

Before describing the overall operation of architecture 100 in more detail, a brief description of some of the items on service computing system 102, and their operation, will first be provided.

Request handling system 138 receives requests from one or more client computing systems 104-106 and performs any processing needed to fulfill those requests, and then generates a response and returns it to the requesting system. Assume, for the sake of example, that client computing system 104 generates a request that is to be handled or serviced by request handling system 138 in service computing system 102. By way of example, it may be that user 118 is attempting to setup a service client component 126 on a user device (such as a desktop computer, a mobile device, etc.) to interact with the user's electronic mail system. In that case, user 118 may provide his or her e-mail address, along with a request for configuration information that will allow the email server to communicate with the user device. That request may be sent over network 112 to request handling system 138.

In order to respond to that request, it may be that request handling system 138 needs to perform one or more workflows by executing operations in request handling system 138 on service computing system 102. In addition, however, it may be that request handling system 138 also needs to make one or more API calls to various different API endpoint computing systems 108-110. Each of those API calls will has its own range of latencies associated with it. For instance, it will have network latency associated with network 112 in sending the API call and receiving a response to that call. Each of the API calls that are responded to will have a latency within the particular endpoint that is responding to them.

Therefore, in accordance with one example, initialization logic 144 receives the request and identifies a set of workflows to be executed, and a set of API calls that will be made to different API endpoint computing systems, in order to service the request. In that case, logic 144 provides a signal to asynchronous API calling engine 148 indicating that API calls will need to be made. Asynchronous API calling engine 148 then interacts with thread scheduling component 140 to obtain a separate computing thread for each of the API calls and to make the API calls, on those separate computing threads to the various API endpoint computing systems 108-110 to which the calls are made. This can be done using bulk threading, multi-processing or multi-threading, or other techniques. In one example, where multiple CPU cores 135 are used, a separate CPU core is allocated to perform the processing tasks used to make each API call. In another example, the API calls are made by a single CPU core 135, but each on a separate thread. Other techniques can be used as well.

At the same time, initialization logic 144 provides a signal to request handling workflow logic 146 to launch and execute the various workflows that are needed in responding to the request. In that way, the API calls are made to the various API endpoint computing systems asynchronously, and concurrently (or in parallel) with one another and with execution of the workflows. Therefore, any latency associated with each of those API calls is no longer additive. Similarly, request handling workflow logic 146 can begin to perform the various operations in the workflows that are to be performed in servicing the request, allowing some workflows to wait on the responses to API calls while processing other calls.

Continuing on with the example discussed above, it is assumed that client computing system 104 has sent an e-mail address to request handling system 138 asking that request handling system 138 obtain and return configuration information so that the user's e-mail system can be properly configured to interact with the user device. In that case, asynchronous API calling engine 148 may need to call different API endpoint computing systems 108-110, such as a known directory of electronic mail addresses, such as a database corresponding to military electronic mail addresses, such as a database corresponding to various consumer/retail domains, a look up through the domain name service (DNS), etc. Asynchronous API calling engine 148 then interacts with thread scheduling component 140 (which may be part of the operating system in computing system 102, or a separate component), and secures a separate computing thread for each of the API calls and makes those calls on the appropriate API endpoint computing systems 108-110. If one of the endpoints identifies the e-mail address as belonging to it, and for which it can provide corresponding configuration information, then that API endpoint computing system responds with the appropriate configuration information so the user's e-mail system can be properly configured to interact with service computing system 102.

In some prior systems, these API calls would be made sequentially. This means that the latency associated with each API call is additive to the overall latency in responding to the request from client computing system 104. Instead, with the present description, initialization logic 144 indicates to asynchronous API calling engine 148 that API calls are to be made when the request is received, and engine 148 can make them asynchronously, or concurrently, on different computing threads, so that the latency associated with each call is not additive. Request handling workflow logic 146 also begins to execute the workflows that are run to respond to the request. Any workflows that are dependent upon the result of an API call will wait for engine 148 to return that result when it is received on its corresponding computing thread. The other workflows, in the meantime, can continue to execute.

Figure 2:
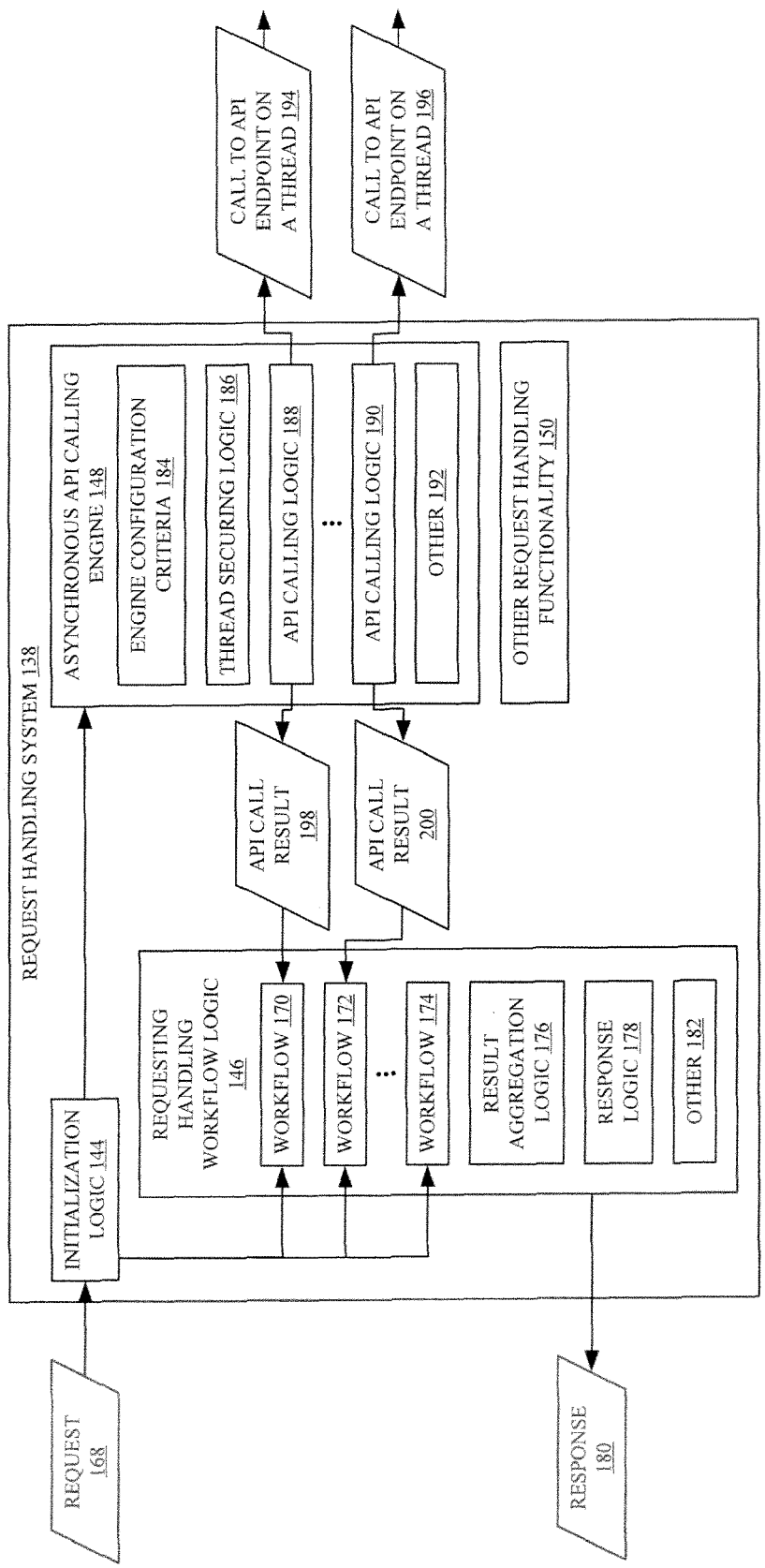
FIG. 2 is a block diagram showing one example of a request handling system in more detail.

FIG. 2 is a block diagram showing one example of request handling system 138 in more detail. Some of the items shown in FIG. 2 are similar to those shown in FIG. 1, and they are similarly numbered.

FIG. 2 shows that request handling workflow logic 146 can run a plurality of different workloads 170, 172, and 174, in responding to a request 168. Logic 146 also illustratively includes result aggregation logic 176 which aggregates the results from the various workflows, to generate a set of workflow results and provides them to response logic 178. Response logic 178 illustratively generates a response 180, in response to the request 168 that was received from a client computing system 104. Request handling workflow logic 146 can include a wide variety of other functionality or items 182 as well.

FIG. 2 also shows that, in one example, asynchronous API calling engine 148 includes a set of engine configuration criteria 184, thread securing logic 186, and a set (or a number of different instances) of API calling logic 188-190. It can include a wide variety of other functionality or items 192 as well.

By way of overview, in operation, initialization logic 144 identifies the workflows that are to be run and the API calls that are to be made in responding to the request 168. It indicates to engine 148 that, in order to respond to request 168, a number of API calls will need to be made. Asynchronous API calling engine 148 then accesses the engine configuration criteria 184 to determine how to handle those API calls. The criteria can be indicative of a wide variety of different types of approaches that can be used by engine 148 in making API calls. The configuration criteria 184 can be set by a user, an administrative user, they can be set as default values by the system itself, or they can be set in other ways.

As examples, engine configuration criteria 184 may indicate that engine 148 is only supposed to make a first API call when request 168 is received a first time. However, if that API call does not adequately respond to request 168, so that request 168 is received a second time, then configuration criteria 184 may indicate that, upon receiving the request the second time, all of the API calls corresponding to that request are to be made by engine 148. This is just one example of how configuration criteria 184 may affect the operation of asynchronous API calling engine 148 in making API calls, and a wide variety of other scenarios or configurations can be indicated by engine configuration criteria 184 as well.

Assume, for the sake of example, that engine configuration criteria 184 indicate that engine 148 is to make all of the API calls corresponding to the request 168. For instance, it may be that workflow 170 depends on the results of a first API call, and workflow 172 depends on the results of a second API call. In that example, thread securing logic 186 then interacts with thread scheduling component 140 to secure a separate computing thread for each of the API calls that are to be made. It then controls API calling logic 188 to make the first API call to an API endpoint computing system on a first thread. The API call is indicated by block 194. It also controls API calling logic 190 to make the second API call, on its own thread, to the second API endpoint computing system. This call is indicated by block 196. In that way, the instances of API calling logic 188 and API calling logic 190 can both make calls, concurrently, on their respective computing threads, and wait for the API endpoint computing system to return the call.

Because asynchronous API calling engine 148 has been invoked, workflow 170 will request the results 198 of the API call 194 from engine 148, instead of attempting to make the API call 194, itself. Thus, as soon as API calling logic 188 receives the response to API call 194, it provides the API call result 198 to workflow 170, which has requested it.

Similarly, workflow 172 will now request the results 200 of the second API call 196 from engine 148, instead of attempting to make the API call 196, itself. Once API calling logic 190 has received the response to API call 196, it sends the API call result 200 to workflow 172. Because the latency associated with API call 194 and API call 196 are occurring substantially simultaneously (or concurrently), that latency is not additive. Therefore, execution of the overall workflow in responding to request 168 can be done much more quickly, using asynchronous API calling engine 148 to make the API calls concurrently with one another and with the execution of workflows 170-174 than in prior systems in which those API calls were made sequentially, by workflows 170-174, as they were executed.

Figure 3A:
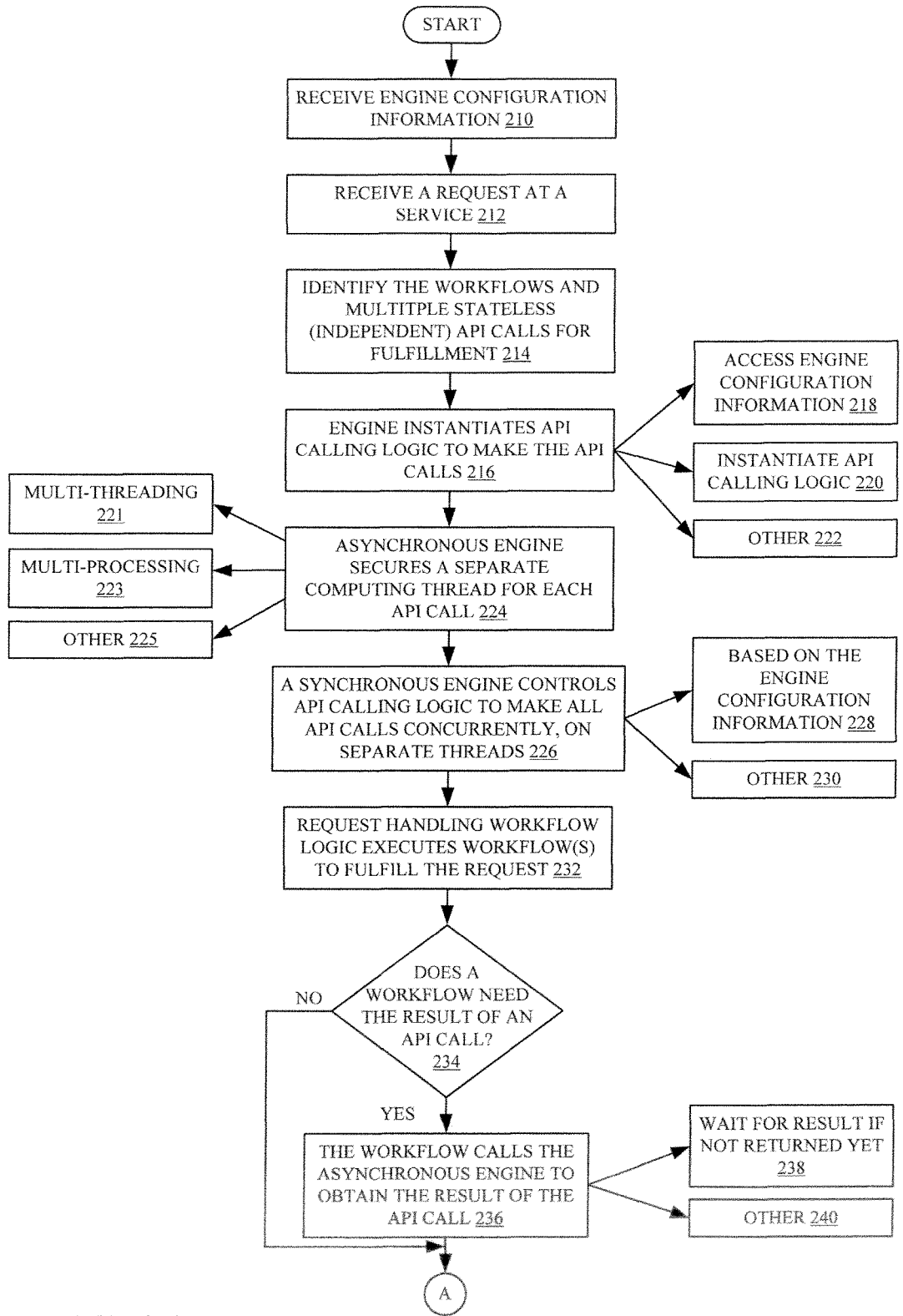
FIGS. 3A and 3B (collectively referred to herein as FIG. 3) show a flow diagram illustrating one example of the operation of the request handling system in responding to a service request.
Figure 3B:
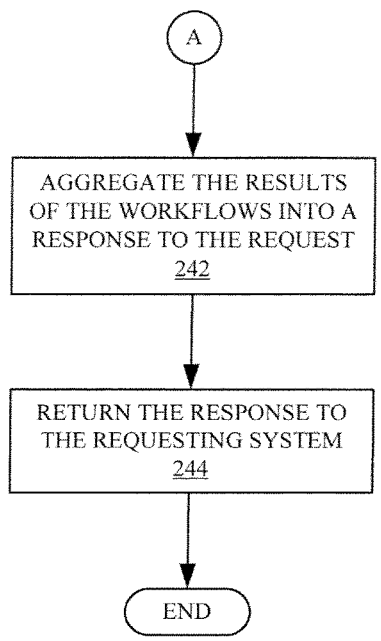

FIGS. 3A and 3B (collectively referred to herein as FIG. 3) show a flow diagram illustrating one example of the operation of request handling system 138 in handling a request 168, for which a plurality of different API calls are to be made, in order to service it. It is first assumed that asynchronous API calling engine 148 has received engine configuration information indicating how it is to handle various API calls in responding to requests that system 138 receives. Again, the configuration information can be received from an administrator, another user, automatically, it can be set to default values, etc. Receiving engine configuration information is indicated by block 210 in the flow diagram of FIG. 3. Request handling system 138 then receives a request 168. Receiving the request is indicated by block 212 in the flow diagram of FIG. 3.

Initialization logic 144 then identifies the workflows and API calls that will be executed in responding to the request 168. Initialization logic 144 illustratively identifies that one or more stateless (e.g., independent) API calls will be made in order for the request 168 to be fulfilled. This is indicated by block 214. As an example, initialization logic 144 identifies request 168 as one which will be fulfilled by running a plurality of different workflows 170-174. Initialization logic 144 also identifies that those workflows, which need to be run to fulfill request 168, are workflows that depend on the results of one or more different API calls. Initialization logic 144 thus provides a signal to asynchronous API calling engine 148 indicating the different API calls that will be made in order to fulfill request 168.

Asynchronous API calling engine 148 then controls the instances of API calling logic 188-190 to make the API calls to obtain the results for workflows 170-174 to fulfill request 168. This is indicated by block 216. In one example, it accesses the engine configuration information 184 in order to do this. This is indicated by block 218. It then instantiates instances of, or otherwise launches, the API calling logic 188-190 that are used to make the API calls. This is indicated by block 220. It can instantiate the API calling logic 188-190, or launch it, or initiate it, in other ways as well. This is indicated by block 222.

Engine 148 uses thread securing logic 186 to interact with thread scheduling component 140 to secure a separate computing thread for each set of API calling logic 188-190, so that the API calls can each be made on a separate thread. Securing a separate computing thread for each set of API calling logic is indicated by block 224 in the flow diagram of FIG. 3. This can be done using multithreading 221 with a single CPU core 135, multiprocessing 223 using separate CPU cores 135, or multithreading on multiple different cores 135, or in other ways 225.

Engine 148 then controls the instances of API calling logic 188-190 to make all API calls, each on a separate thread, concurrently and asynchronously with respect to one another and with respect to execution of portions of workflows 170-174 that do not depend on the results of the API calls. This is indicated by block 226 in the flow diagram of FIG. 3. Again, the way this is done (such as the number of API calls initially made, etc.) can be based on the engine configuration information, as indicated by block 228. Engine 148 can control the instances of API calling logic 188-190 to make the API calls 194-196 in other ways as well, and this is indicated by block 230.

While engine 148 is making those API calls, request handling workflow logic 148 begins executing the workloads 170-174, that are to be executed in order to respond to request 168. Any workflows that can be fully executed without waiting for an API call result are executed, and those workflows need not incur any latency, at all, that would otherwise result from other workflows having API calls made. Workflows (such as workflows 170-172) which do depend on API call results can execute up to the point where those results are needed, and then indicate to engine 148 that they are waiting on the API call results. Executing workflows to fulfill request 168 is indicated by block 232 in the flow diagram of FIG. 3.

At some point, if a workflow is waiting for an API call result (e.g., if workflow 170 needs to wait for API call result 198) then the workflow calls engine 148 to obtain the API call result 198. Determining whether a workflow depends on an API call result is indicated by block 234, and having the workflow call the engine 148 for the API call result (instead of making the call itself) is indicated by block 236. A particular workflow (such as workflow 170) which uses an API call result 198, where the API call 194 has a relatively long latency, can wait for engine 148 to return that API call result 198, but this will not affect any of the other workflows 172-174 in executing. Waiting for the API call result 198, if it is not returned yet, is indicated by block 238. The workflow can obtain the API call result from engine 148 in other ways as well, and this is indicated by block 240.

Once all of the workflows 170-174 (needed for responding to request 168) have been executed, then result aggregation logic 176 aggregates the results of the workflows into a response to request 168. Response logic 178 returns response 180 to the calling system, which sent request 168. Aggregating the results into a response is indicated by block 242, and returning that response to the requesting system is indicated by block 244.

In one example, not all of the results of the workflows 170-174 need to be aggregated into the response. Instead, it may be that the results of the various workflows are returned, alternatively, to the requesting system. For instance, if each of the workflows 170-174 are executed, independently of one another, to find the location of configuration information corresponding to an e-mail address that is submitted as part of request 168, then whichever workflow 170-174 finds that configuration information will be the workflow which provides a result that is used to respond to request 168. In that case, result aggregation logic 176 simply identifies the responsive result (instead of aggregating all of the results together) as containing the information which needs to be sent in response 180. Response logic 178 then sends only that information.

This description enables significant improvements in the operation of computing system 102, itself. By way of example, assume that during the time that workflow 170 is waiting for API call result 198, API Calling logic 190 has already received the API call result 200 and provided it to workflow 172. Thus, instead of waiting for API call result 198 to be returned to workflow 170, and only then initiating the second API call 196, the two API calls 194 and 196 are done by bulk threading, multithreading or multiprocessing the calls at the point just after initialization logic 144 receives request 168. Engine 148 then begins the process of making the API calls, as it is configured to do so by the configuration criteria. In one example, it can make them all at the start of the process. Therefore, the latency in making those calls begins at the start of the process of responding to request 168. This provides significant advantages in the operation of the computing system 102, itself. It reduces the latency in responding to a request 168 from a cumulative latency (of all API calls) to a maximum latency (that is, the API call that has the largest latency). Thread securing logic 186 also takes advantage of multiple CPU cores which may be used in system 102, and it creates a highly scalable process, which can accommodate slow API calls that may be added in the future. Further, engine configuration criteria 184 enables the operation of asynchronous API calling engine 148 to be configured in different ways, and modified, as desired. Engine 148 can also be implemented very easily on existing code bases, with minimal changes to the existing code. For instance, the various workflows 170-174 may be modified to request the API call results from asynchronous API calling engine 148, instead of making the API calls themselves. Other than this, the existing code need not be substantially changed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
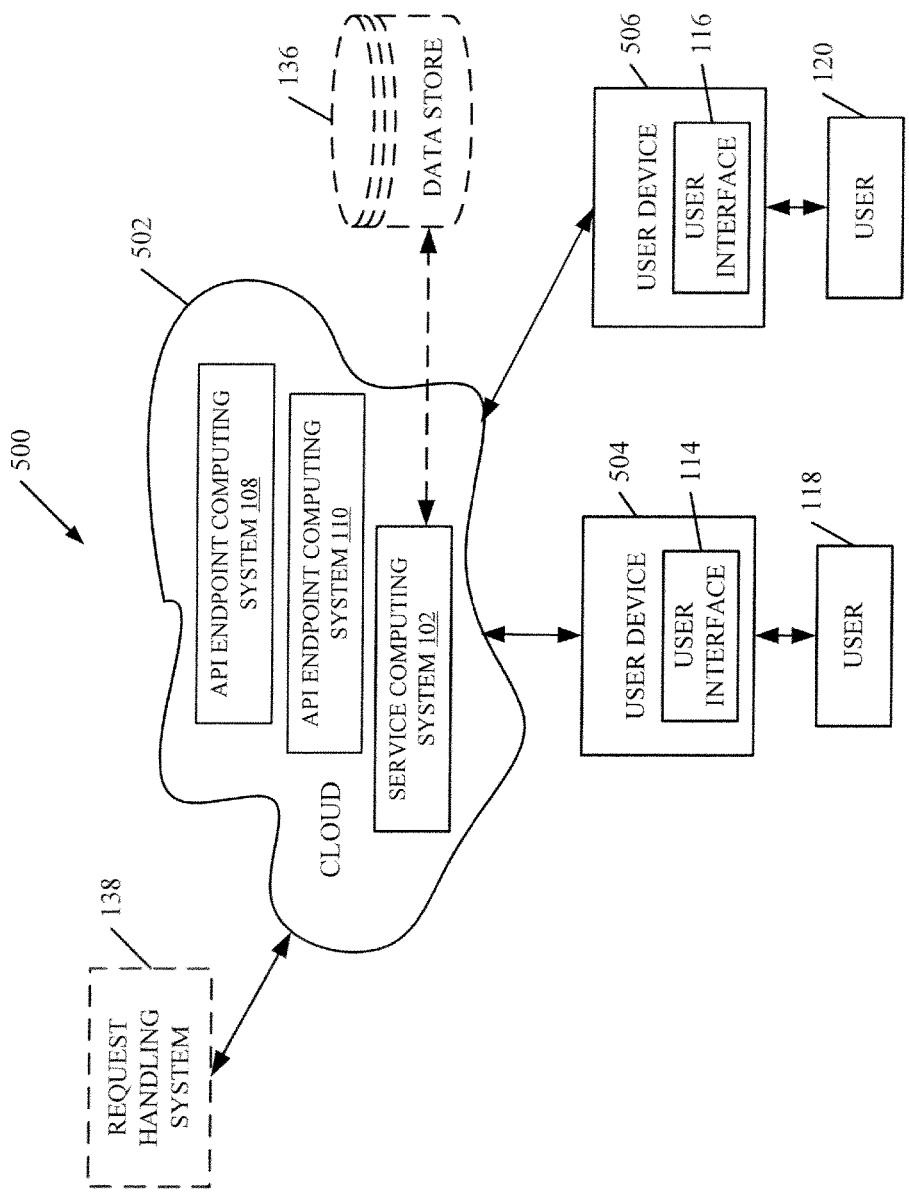
FIG. 4 is a block diagram showing the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that service computing system 102 and API endpoint computing systems 108-110 can be located in cloud 502 (which can be public, private, or a combination where portions are public while others are private). Therefore, users 118 and 120 use user devices 504 and 506 to access those systems through cloud 502.

FIG. 4 also depicts another example of a cloud architecture. FIG. 4 shows that it is also contemplated that some elements of computing system 102 can be disposed in cloud 502 while others are not. By way of example, data store 136 can be disposed outside of cloud 502, and accessed through cloud 502. In another example, request handling system 138 (or other items) can be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
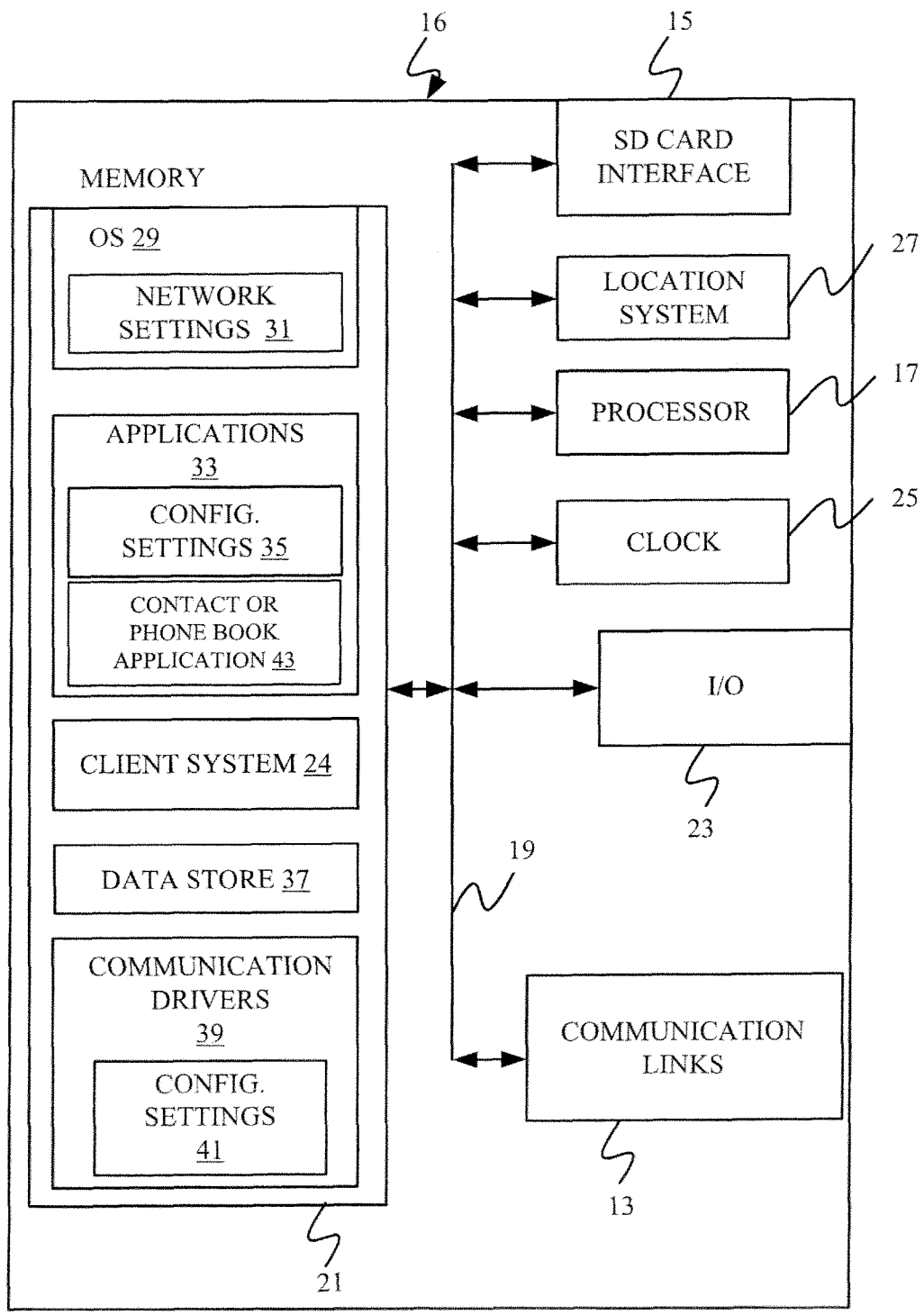
FIGS. 5-7 show examples of mobile devices that can be used in the architectures shown in the previous figures.
Figure 6:
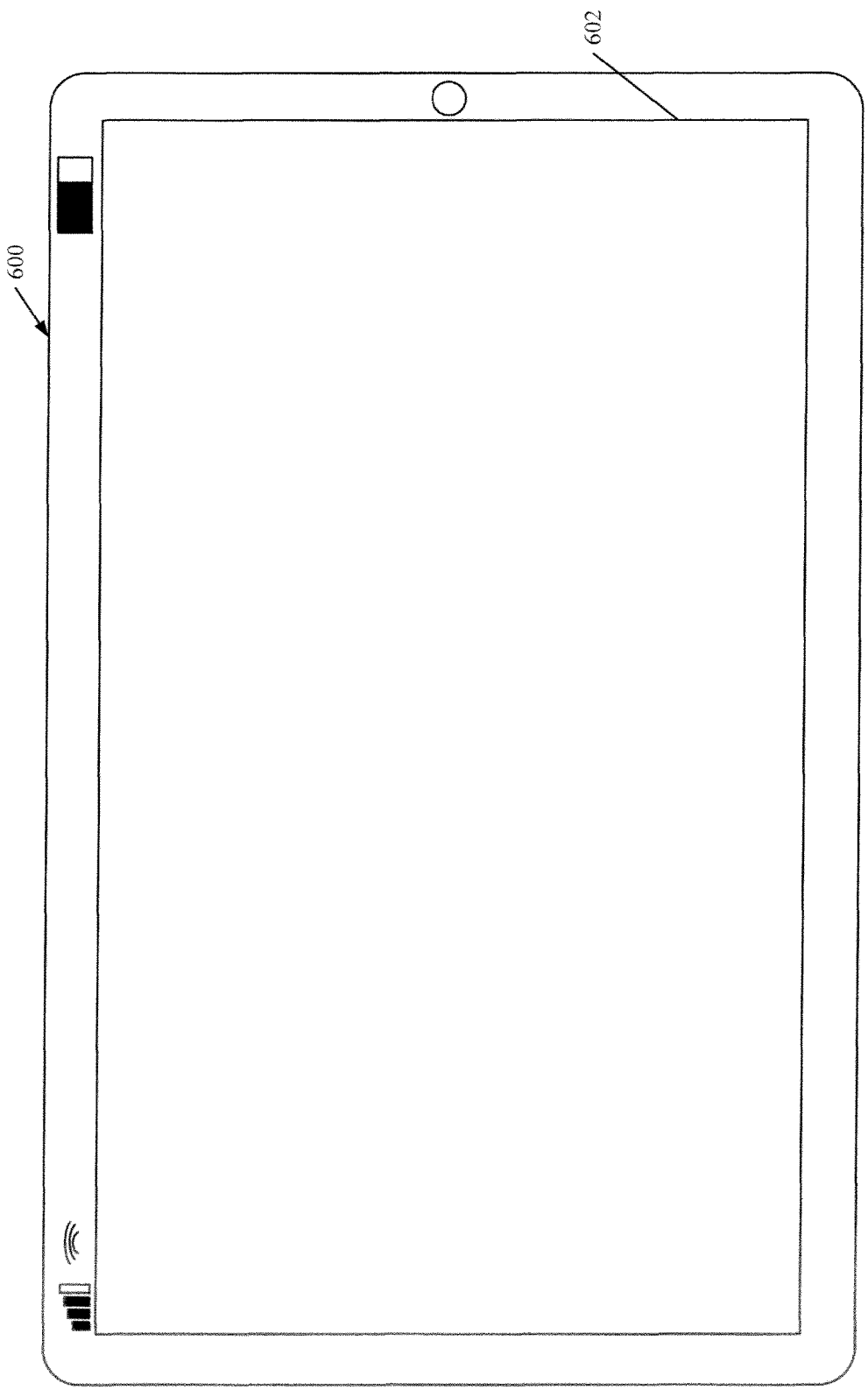
Figure 7:
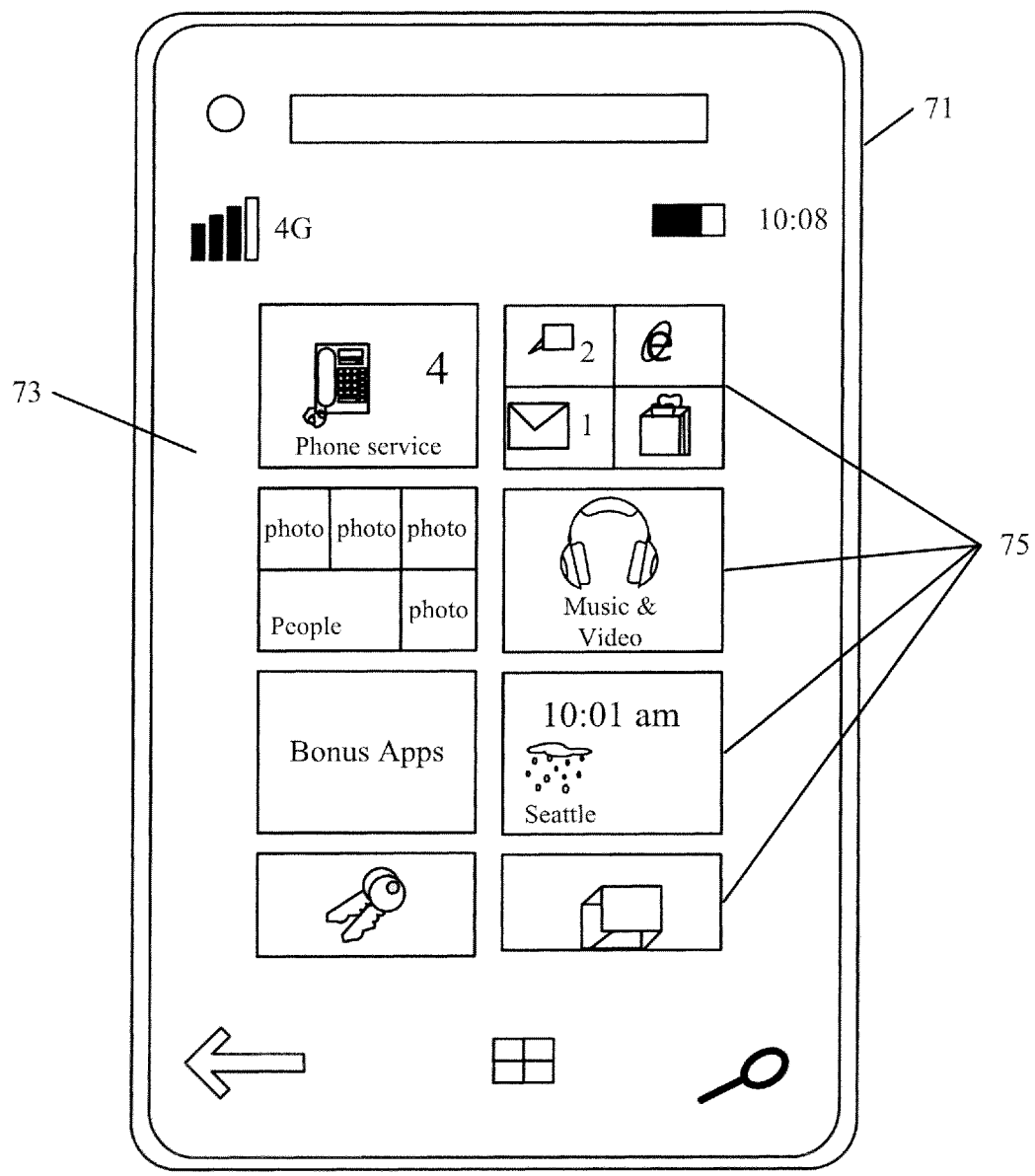

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components computing system 102 or user devices 504 or 506 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
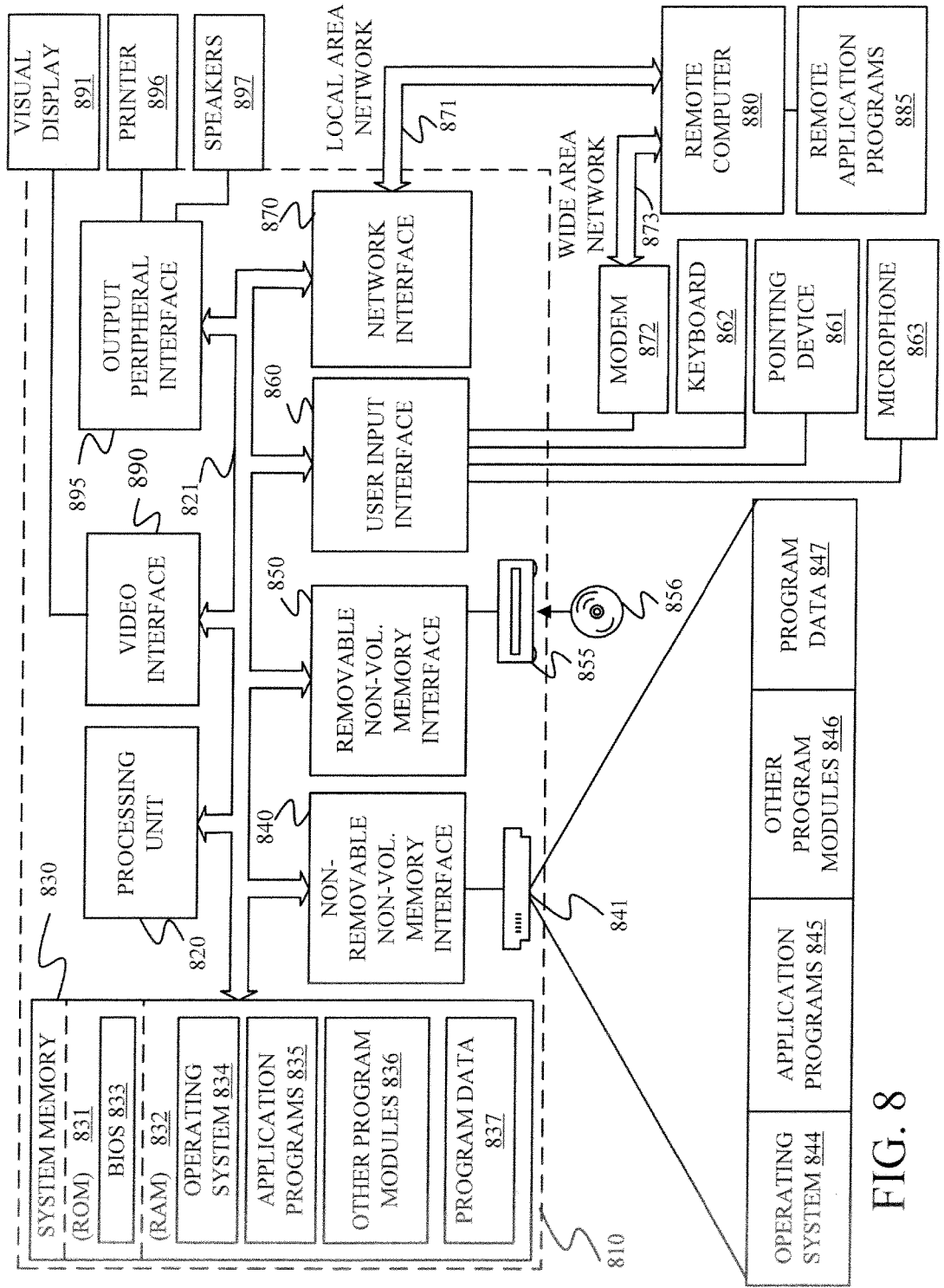
FIG. 8 is a block diagram showing one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

initialization logic that receives a service request and identifies a set of workflows to be executed, and a set of application programming interface (API) calls to be made, in responding to the service request and generates an initialization output signal indicative of the set of workflows and the set of API calls;

an API calling engine that makes the set of API calls, concurrently with one another, based on the initialization output signal, and receives API call results;

request handling workflow logic that executes the set of workflows to obtain workflow results, to respond to the service request, the result handling workflow logic executing the set of workflows concurrently with, and asynchronously with respect to, the API calling engine making the set of API calls, wherein results of a given workflow, in the set of workflows, are dependent on the API call results of one of the set of API calls, wherein the given workflow is configured to access the API call results from the API calling engine; and response logic that generates a response to the service request based on the workflow results.

Example 2 is the computing system of any or all previous examples wherein each API call is made by performing a set of corresponding processing tasks, and further comprising:

a plurality of central processing unit (CPU) cores, wherein the API calling engine is configured to perform multiprocessing by allocating the sets of processing tasks, corresponding to the different API calls in the set of API calls, among the plurality of different CPU cores.

Example 3 is the computing system of any or all previous examples and further comprising:

thread securing logic configured to secure a separate computing thread, on a separate one of the plurality of CPU cores, corresponding to each API call in the set of API calls, so the set of processing tasks corresponding to each API call are made on separate threads.

Example 4 is the computing system of any or all previous examples wherein the API calling engine comprises:

a separate instance of API calling logic corresponding to each API call, in the set of API calls, wherein the API calling engine is configured to control the separate instances of API calling logic to make the corresponding API calls.

Example 5 is the computing system of any or all previous examples wherein the set of workflows includes:

a first workflow that generates a first workflow result that depends on a result of a first API call, in the set of API calls; and a second workflow that generates a second workflow result that depends on a result of a second API call, in the set of API calls.

Example 6 is the computing system of any or all previous examples wherein the thread securing logic secures a first thread on which a first instance of API calling logic makes the first API call and a second thread on which a second instance of API calling logic makes the second API call, wherein the first and second instances of the API calling logic are configured to make the first and second API calls concurrently, and asynchronously, with respect to one another.

Example 7 is the computing system of any or all previous examples and further comprising:

result aggregation logic configured to aggregate the first and second workflow results to obtain aggregate results and provide the aggregate results to the response logic for generation of the response.

Example 8 is the computing system of any or all previous examples wherein the API calling engine is configured to access engine configuration criteria and identify which of the set of API calls are to be made based on the engine configuration criteria and to control instances of API calling logic to make only the identified API calls.

Example 9 is the computing system of any or all previous examples wherein the API calling engine is configured to identify the API calls as a subset of the set of API calls.

Example 10 is a computer implemented method, comprising:

receiving, at a service computing system, a service request;

identifying a set of workflows to be executed and a set of application programming interface (API) calls to be made in responding to the service request;

generating an initialization output signal indicative of the set of workflows and the set of API calls;

making the set of API calls, based on the initialization output signal, concurrently with one another;

receiving API call results;

executing the set of workflows, asynchronously relative to making the set of API calls, to obtain workflow results, to respond to the service request, wherein results of a given workflow are dependent on an API call result of at least one of the set of API calls; and generating a response to the service request based on the workflow results.

Example 11 is the computer implemented method of any or all previous examples wherein making the API calls concurrently with one another comprises:

performing a set of processing steps corresponding to each API call, to make each API call in the set of API calls.

Example 12 is the computer implemented method of any or all previous examples wherein making the set of API calls comprises:

allocating each set of processing steps to a different computing system thread.

Example 13 is the computer implemented method of any or all previous examples wherein making the set of API calls is performed by a computing system having a plurality of different central processing unit (CPU) cores and wherein making the set of API calls comprises:

allocating each set of processing steps to a different CPU core of the plurality of different CPU cores.

Example 14 is the computer implemented method of any or all previous examples wherein making the set of API calls is performed concurrently with, and asynchronously with respect to, executing the set of workflows.

Example 15 is the computer implemented method of any or all previous examples wherein making the set of API calls comprises:

controlling a separate instance of API calling logic, corresponding to each of the API calls in the set of API calls, to make the corresponding API call.

Example 16 is the computer implemented method of any or all previous examples wherein identifying a set of API calls to be executed includes:

identifying a first workflow, in the set of workflows, that generates a first workflow result that depends on a result of a first API call, in the set of API calls; and identifying a second workflow, in the set of workflows, that generates a second workflow result that depends on a result of a second API call, in the set of API calls.

Example 17 is the computer implemented method of any or all previous examples wherein allocating each set of processing steps to a different CPU core comprises:

allocating a first set of processing steps corresponding to the first API call to a first CPU core of the plurality of CPU cores; and allocating a second set of processing steps corresponding to the second API call to a second CPU core of the plurality of CPU cores, the first and second CPU cores performing the first and second sets of processing steps, respectively, asynchronously with respect to one another.

Example 18 is the computer implemented method of any or all previous examples wherein making the set of API calls comprises:

accessing engine configuration criteria; and identifying which of the set of API calls are to be made based on the engine configuration criteria; and making only the identified API calls.

Example 19 is a computing system, comprising:

a plurality of central processing unit cores;

initialization logic that receives a service request and identifies a set of workflows to be executed and a set of application programming interface (API) calls to be made in responding to the service request and that generates an initialization output signal indicative of the set of workflows and the set of API calls;

an API calling engine that makes each of the API calls, in the set of API calls, using a separate CPU core, of the plurality of different CPU cores, and concurrently with one another, based on the initialization output signal, the API calling engine receiving API call results;

request handling workflow logic that executes the set of workflows to obtain workflow results, to respond to the service request, the result handling workflow logic executing the set of workflows concurrently with, and asynchronously with respect to, the API calling engine making the set of API calls, wherein results of a given workflow, in the set of workflows, are dependent on the API call results of one of the set of API calls, wherein the given workflow is configured to access the API call results from the API calling engine; and response logic that generates a response to the service request based on the workflow results.

Example 20 is the computing system of any or all previous examples wherein the API calling engine is configured to access engine configuration criteria and identify, based on the engine configuration criteria, which API calls in the set of API calls are to be made and to make only the identified API calls.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   initialization logic that receives a service request and identifies a set of workflows to be executed, and a set of application programming interface (API) calls to be made, in responding to the service request and generates an initialization output signal indicative of the set of workflows and the set of API calls;
   an API calling engine that makes the set of API calls, concurrently with one another, based on the initialization output signal, and receives API call results;
   request handling workflow logic that executes the set of workflows to obtain workflow results, to respond to the service request, the result handling workflow logic executing the set of workflows concurrently with, and asynchronously with respect to, the API calling engine making the set of API calls, wherein results of a given workflow, in the set of workflows, are dependent on the API call results of one of the set of API calls, wherein the given workflow is configured to access the API call results from the API calling engine; and
   response logic that generates a response to the service request based on the workflow results.

2. The computing system of claim 1 wherein each API call is made by performing a set of corresponding processing tasks, and further comprising:
   a plurality of central processing unit (CPU) cores, wherein the API calling engine is configured to perform multiprocessing by allocating the sets of processing tasks, corresponding to the different API calls in the set of API calls, among the plurality of different CPU cores.

3. The computing system of claim 2 and further comprising:
   thread securing logic configured to secure a separate computing thread, on a separate one of the plurality of CPU cores, corresponding to each API call in the set of API calls, so the set of processing tasks corresponding to each API call are made on separate threads.

4. The computing system of claim 3 wherein the API calling engine comprises:
   a separate instance of API calling logic corresponding to each API call, in the set of API calls, wherein the API calling engine is configured to control the separate instances of API calling logic to make the corresponding API calls.

5. The computing system of claim 4 wherein the set of workflows includes:
   a first workflow that generates a first workflow result that depends on a result of a first API call, in the set of API calls; and
   a second workflow that generates a second workflow result that depends on a result of a second API call, in the set of API calls.

6. The computing system of claim 5 wherein the thread securing logic secures a first thread on which a first instance of API calling logic makes the first API call and a second thread on which a second instance of API calling logic makes the second API call, wherein the first and second instances of the API calling logic are configured to make the first and second API calls concurrently, and asynchronously, with respect to one another.

7. The computing system of claim 6 and further comprising:
   result aggregation logic configured to aggregate the first and second workflow results to obtain aggregate results and provide the aggregate results to the response logic for generation of the response.

8. The computing system of claim 4 wherein the API calling engine is configured to access engine configuration criteria and identify which of the set of API calls are to be made based on the engine configuration criteria and to control instances of API calling logic to make only the identified API calls.

9. The computing system of claim 8 wherein the API calling engine is configured to identify the API calls as a subset of the set of API calls.

10. A computer implemented method, comprising:
    receiving, at a service computing system, a service request;
    identifying a set of workflows to be executed and a set of application programming interface (API) calls to be made in responding to the service request;
    generating an initialization output signal indicative of the set of workflows and the set of API calls;
    making the set of API calls, based on the initialization output signal, concurrently with one another;
    receiving API call results;
    executing the set of workflows, asynchronously relative to making the set of API calls, to obtain workflow results, to respond to the service request, wherein results of a given workflow are dependent on an API call result of at least one of the set of API calls; and
    generating a response to the service request based on the workflow results.

11. The computer implemented method of claim 10 wherein making the API calls concurrently with one another comprises:
    performing a set of processing steps corresponding to each API call, to make each API call in the set of API calls.

12. The computer implemented method of claim 11 wherein making the set of API calls comprises:
    allocating each set of processing steps to a different computing system thread.

13. The computer implemented method of claim 11 wherein making the set of API calls is performed by a computing system having a plurality of different central processing unit (CPU) cores and wherein making the set of API calls comprises:
    allocating each set of processing steps to a different CPU core of the plurality of different CPU cores.

14. The computer implemented method of claim 10 wherein making the set of API calls is performed concurrently with, and asynchronously with respect to, executing the set of workflows.

15. The computer implemented method of claim 13 wherein making the set of API calls comprises:
    controlling a separate instance of API calling logic, corresponding to each of the API calls in the set of API calls, to make the corresponding API call.

16. The computer implemented method of claim 15 wherein identifying a set of API calls to be executed includes:
    identifying a first workflow, in the set of workflows, that generates a first workflow result that depends on a result of a first API call, in the set of API calls; and
    identifying a second workflow, in the set of workflows, that generates a second workflow result that depends on a result of a second API call, in the set of API calls.

17. The computer implemented method of claim 16 wherein allocating each set of processing steps to a different CPU core comprises:
    allocating a first set of processing steps corresponding to the first API call to a first CPU core of the plurality of CPU cores; and
    allocating a second set of processing steps corresponding to the second API call to a second CPU core of the plurality of CPU cores, the first and second CPU cores performing the first and second sets of processing steps, respectively, asynchronously with respect to one another.

18. The computer implemented method of claim 11 wherein making the set of API calls comprises:
    accessing engine configuration criteria; and
    identifying which of the set of API calls are to be made based on the engine configuration criteria; and
    making only the identified API calls.

19. A computing system, comprising:
    a plurality of central processing unit cores;
    initialization logic that receives a service request and identifies a set of workflows to be executed and a set of application programming interface (API) calls to be made in responding to the service request and that generates an initialization output signal indicative of the set of workflows and the set of API calls;
    an API calling engine that makes each of the API calls, in the set of API calls, using a separate CPU core, of the plurality of different CPU cores, and concurrently with one another, based on the initialization output signal, the API calling engine receiving API call results;
    request handling workflow logic that executes the set of workflows to obtain workflow results, to respond to the service request, the result handling workflow logic executing the set of workflows concurrently with, and asynchronously with respect to, the API calling engine making the set of API calls, wherein results of a given workflow, in the set of workflows, are dependent on the API call results of one of the set of API calls, wherein the given workflow is configured to access the API call results from the API calling engine; and
    response logic that generates a response to the service request based on the workflow results.

20. The computing system of claim 19 wherein the API calling engine is configured to access engine configuration criteria and identify, based on the engine configuration criteria, which API calls in the set of API calls are to be made and to make only the identified API calls.

* * * * *